UNITED STATES PATENT OFFICE.

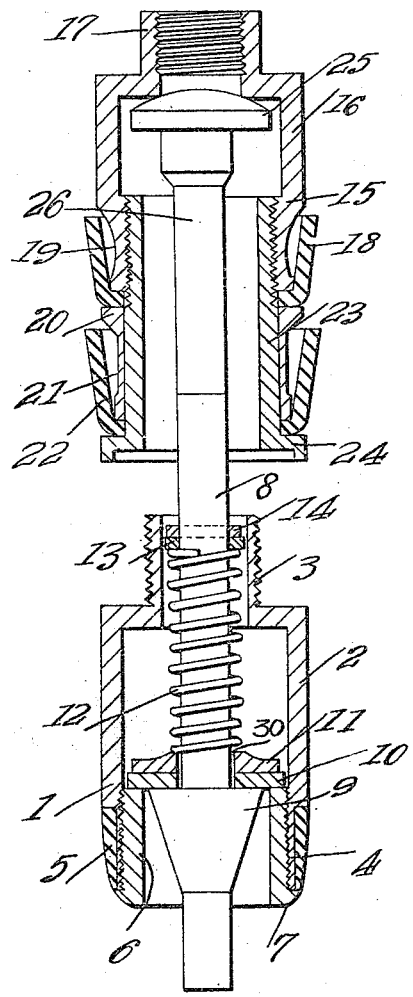

THOMAS J. LOWER, OF STRASBURG, NORTH DAKOTA.

PUMP-VALVE.

1,256,028.     Specification of Letters Patent.     Patented Feb. 12, 1918.

Application filed April 3, 1917. Serial No. 159,484.

*To all whom it may concern:*

Be it known that I, THOMAS J. LOWER, a citizen of the United States, residing at Strasburg, in the county of Emmons and State of North Dakota, have invented new and useful Pump-Valves, of which the following is a specification.

The present invention relates to pump valves, and aims to provide a novel and improved valve construction for use in deep well and other pumps, whereby when the plunger is lowered to its extreme lowered position, the valve of the plunger will be unseated, and the check valve will be so operated as to permit the head of water to drain downwardly past the valves, said valves, however, preventing the downward flow of water when the plunger is raised away from the check valve.

It is the object of the invention to provide a valve construction of the nature indicated embodying a novel assemblage of the component elements, to enhance the utility and efficiency of the device, and to render the same simple and inexpensive in construction.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein the figure is a vertical central section of the valve construction, portions being shown in elevation.

The lower check valve, used in the pump, in accordance with the present invention embodies a body 1 having an arched spider 2 provided at its upper central portion with an upstanding boss or neck 3, and the body 1 is provided with a depending reduced boss 4 which is embraced by a packing ring 5 to fit within the well casing or barrel for holding the check valve in place and preventing leakage around it. A sleeve 6 is threaded into the body 1 and provides a valve seat at its upper end, and the lower end of the sleeve has an outturned flange 7 for retaining the packing ring 5 upon the boss 4.

A vertical valve stem 8 extends centrally through the neck 3, body 1 and sleeve 6, and is provided within said sleeve with a frusto-conical or downwardly tapered enlargement 9 whose larger end is uppermost to provide an upwardly facing shoulder. A packing washer 10 surrounds the stem 8 above the enlargement 9, and a valve ring 11 is seated upon the washer 10, the apertures of said washer and ring being of larger diameter than the stem 8. The washer 10 is normally clamped between the shoulder of the enlargement 9 and the ring 11 by means of a coiled wire expansion spring 12 surrounding the stem 8 and confined between the washer 11 at its lower end and a collar or washer 13 upon the stem 8 at the upper end of the spring. This collar or washer 13 is held in place by means of a pin 14 or other suitable retaining means, whereby the spring 12 normally moves the ring 11 downwardly with sufficient force to clamp the washer 10 between said ring and enlargement 9, said enlargement therefore closing the aperture of the washer 10 to prevent leakage therethrough. The washer 10 and ring 11 thus provide the valve member which is seatable downwardly on the sleeve or seat 6 to provide the check valve for supporting the head of water, said valve member unseating upwardly when the water is sucked upwardly as usual.

Above the check valve, is the plunger or piston, which as illustrated embodies the annular body 15 having the arched spider 16 provided at its upper central portion with an upstanding boss or neck 17 for the attachment of the pump rod for reciprocating the plunger. A leather or equivalent packing cup 18 is seated against the lower end of the body 15 and extends upwardly around said body, the body having an annular groove 19 for receiving the rim of the packing cup. A ring 20 is seated upwardly against the packing cup 18 and a second packing cup 22 is seated upwardly against the ring 20, said ring having an annular groove 21 for receiving the rim of the packing cup 22. A sleeve 23 extends upwardly through the packing cups and ring 20 and is threaded into the body 15 to hold the packing cups in place, the sleeve 23 having an outstanding flange 24 at its lower end bearing against the packing cup 22. Thus, when the sleeve 22 is screwed tightly into place, the packing cups and ring 20 are clamped tightly between the body 15 and flange 24. A puppet valve 25 is movable within the spider 16 and is seatable on the upper end of the sleeve 23 which provides a valve seat, said valve 25 having a depending stem 26.

In order to drain the water from the valve casing or barrel, the plunger is moved downwardly, as shown in the drawing, whereby the valve stem 26 seats upon or abuts against the valve stem 8, thereby raising the valve 25 from said seat, and when the valve 25 strikes the upper portiton of the spider 16, the further movement of the plunger will force the stem 8 downwardly against the tension of the spring 12. This will move the enlargement 9 away from the washer 10, and as a result, the opening of said washer will be uncovered, so that the water can flow downwardly through the space 30 between the stem 8 and the ring 11 and washer 10 past the check valve. The valves of the plunger and check valve being opened enables the water to drain downwardly past them, and when the plunger is again raised, this will release the valve stems so that the valve members will again seat.

Having thus described the invention, what is claimed as new is:—

A valve structure, comprising a spider formed with an outwardly projecting boss at the central portion of its arch, and a reduced portion depending from the spider, an annular washer encircling the reduced portion, a sleeve threaded into the reduced portion, and formed with an outwardly projecting annular flange, said sleeve forming a valve seat, a valve seatable on the sleeve and provided with a central aperture, a stem passing centrally through the reduced portion and the boss and spaced from the wall defining the aperture of the valve, an enlargement on the stem providing a shoulder seatable upwardly against the valve, and means secured to the stem for retaining the shoulder and valve in contact, the stem being depressible to remove the shoulder from the valve.

In testimony that I claim the foregoing as my own, I have hereto affixed my signature in the presence of two witnesses.

THOMAS J. LOWER.

Witnesses:
J. S. FISCHER,
A. R. TUAST.